United States Patent Office 3,359,266
Patented Dec. 19, 1967

3,359,266
PROCESS FOR PREPARING PHOSPHORUS-CONTAINING MANNICH BASES
Ludwig Maier, Zurich, Switzerland, assignor to Monsanto Company, St. Louis, Mo., a corporation of Delaware
No Drawing. Filed June 10, 1966, Ser. No. 556,583
15 Claims. (Cl. 260—246)

This application is a continuation-in-part of copending application Ser. No. 328,502, filed Dec. 6, 1963, now abandoned. Phosphorous-containing Mannich bases, as they can be prepared within the scope of this invention by a novel simple process, have hitherto already been obtained in another manner.

One class of these compounds possesses the general formula $$P[R—NR'R'']_3$$

wherein R is a possibly substituted methylene radical and NR'R'' a radical of a primary or secondary amine. A simple representative of this class is e.g. the compound $P[CH_2N(C_2H_5)_2]_3$. Such compounds are obtained by reaction of phosphine ($PH_3$), either with formaldehyde and a primary or secondary amine, or with a methylolamine, or with a methylenediamine (German Patent 1,096,905). According to another well-known process the same compounds are formed by action of amines on tetrakishydroxymethylphosphonium salts (German Patent 1,077,214 and British Patent 842,593).

A further class which is available from phosphorous acid ($H_3PO_3$), formaldehyde and amines, possesses the general formula $$(HO)_2P(O)R—NR'R''$$

wherein the symbols have the same significance as above. A simple representative of this class is e.g. the compound $$(HO)_2P(O)CH_2N(C_2H_5)_2$$

Still a further class is formed, when hypophosphorous acid ($H_3PO_2$) is substituted for phosphorous acid. It corresponds to the general formula $$HOP(O)[R—NR'R'']_2$$

wherein the symbols again have the same significance as above. A simple representative of this class is e.g. the compound $$HOP(O)[CH_2N(C_2H_5)_2]_2$$

Now it has been found that these compounds can also be prepared when white phosphorus is brought to reaction with suitable aldehydes and amines in a solvent. The Mannich bases which can be prepared by the process of the invention are of the formula $$(HO)_aP(O)_b(RNR'R'')_c$$

wherein R is a substituted or unsubstituted methylene group, NR'R'' is a residue of a primary or secondary amine, $a=0$, 1 or 2 but is 0 if $b=0$, $b=0$ or 1, $c=1$, 2 or 3 and $a+b+c=3$ or 4 depending on the valence of the phosphorus atom. Normally R will be a CHR''' group wherein R''' is a hydrocarbyl group which is not sterically voluminous, R' when taken singly is a hydrogen atom, a hydrocarbyl group which is not sterically voluminous or a hydroxy-substituted hydrocarbyl group which is not sterically voluminous, R'' when taken singly is a hydrocarbyl group which is not sterically voluminous or a hydroxy-substituted hydrocarbyl group which is not sterically voluminous, R' and R'' when taken together with the nitrogen atom to which they are attached form heterocyclic groups which in addition to nitrogen and methylene groups can also contain oxygen atoms and other heteroatoms such as sulfur and other nitrogen atoms in the ring and the methylene groups can be substituted with methyl groups. Normally R, R', R'' and R''' will each have not more than 24 carbon atoms.

Formaldehyde is an especially suitable aldehyde. However, many other aldehydes are utilizable, instead of formaldehyde. But, depending on the circumstances, their expediency may be restricted because of possible aldolization, formation of enamines and Schiff bases, Knoevenagel condensation, steric hindrance and so on. These facts have to be considered especially if the intermediate alkylolamines (N-semiacetals) are to be prepared, separated and purified.

Sensitive aldehydes, such as e.g. phenyl-acetaldehyde, can be used according to the conditions of the reaction in a blocked form, such as acetals, hydrogen sulfite adducts and also glycidyl esters. The compounds, such as e.g. phenyl-pyruvic acid, capable of generating aldehydes under the conditions herein employed, are suitable too. The aldehydes can also be unsaturated, such as e.g. crotonaldehyde, or can contain substituents, such as e.g. trichloroacetaldehyde. Most of the known amines are suitable for the present process. It is well-known in the preparation of Mannich bases starting from other H-acidic reactants, such as nitrohydrocarbons, ketones, nitriles, sulfones, sulfoxides and carboxylic acids having activating groups in the alpha-position that the course of the reaction with secondarp amines is more distinct and leading to more uniform products, than with primary amines. It is also well-known that many secondary amines, such as methyl-isopropylamine, di-isopropylamine, isopropyl-tetrahydrofurylamine and many others, give no or only small amounts of Mannich bases, which are easily hydrolyzable.

It is clear that as secondary amines, cyclic amines, such as pyrrolidine, pyrazoline, imidazoline, piperidine, morpholine, thiazine and the like can be used. In these cases in the formula set forth above, the groups R' and R'' taken together form with the nitrogen atom a heterocyclic group. The cyclic aminocarbinols resulting from the intramolecular reaction of an aminoaldehyde are also suitable for the novel process to the extent that they are cleaved in the reaction medium.

The amines reacting as H-acid components, such as pyrrole, hydroxamic acids, amides of organic and inorganic acids, also pyrrolidone, N-arylhydroxylamines and the like are, however, not suitable for the process. In the limiting region comprising compounds such as diphenylamine, carbazole, pyrrole, pyrazole, imidazole and the like, a test experiment must be run to determine whether the nitrogen-containing component will react as an amine or not. Amines with a secondary or tertiary carbon atom in the vicinity of the nitrogen atom such as e.g. di-isopropylamine, di-iso-butylamine and di-tert-butylamine are also unsuitable.

The possibility of formation of the alkylolamines necessary as intermediates, the behavior of the aldehydes to be reacted, the bulkiness of the radicals on the nitrogen, the reactivity of the active methylene compound, the tendency of tautomerism, and other facts not yet foreseen, play an important role in the success of the reaction.

But, since it has been demonstrated herein for the first time that some amines and aldehydes are utilizable in the novel reaction, no creative effort is needed by those skilled in the art to find out simply by trying other reactants, since the choice of available aldehydes and amines is a large one.

From what has been explained above, it is evident that mixtures consisting of various phosphorus-containing Mannich bases can simultaneously be formed during the course of reaction. Thus, the dialkylolamines resulting from primary amines can yield cyclic or polymeric compounds. Such mixtures nevertheless are valuable, since they can directly be used for many purposes, such as, for example, making flame-proof the combustible material.

Whereas in previous processes the product phosphorus-containing bases together with the starting product (e.g. $PH_3$) or with other intermediate phosphorus-containing H-acidic compounds [e.g. $Me_2NCH_2PH_2$ and $$(Me_2NCH_2)_2PH]$$

can further condense

[e.g. to $(Me_2NCH_2)_2PCH_2P(CH_2NMe_2)_2$]

this possibility is practically excluded in the present process, because phosphorus is present as starting product, from which the desired endproducts are formed at once and continuously.

All the phosphorus-containing Mannich bases which are considered herein are characterized by the presence of the grouping P—R—NR'R", wherein R is a possibly substituted methylene radical derived from an aldehyde able to undergo the reaction, and NR'R" is an amine radical derived from a primary or secondary amine able to undergo the reaction.

When practicing the invention, at first the corresponding alkylolamines are prepared from the aldehyde and the amine at low temperatures in a manner which is known by itself. The alkylolamines need not to be isolated and purified, but can directly be converted at higher temperatures into the desired phosphorus-containing Mannich bases, or mixtures of various Mannich bases, respectively, by addition of white phosphorus, if the latter was not contained in the reaction mixture from the beginning.

The reaction is carried out in a solvent. As a rule, all of the three aforementioned phosphorus-containing Mannich bases are formed together. It has been found that the quantitative relation of these three endproducts can be affected by the proportion of the reactants, the kind of the solvent and the water content of the aqueous solvent generally used. The reaction proceeds most rapidly in water, however, the yields of tertiary phosphine oxide are the smallest ones. In general, for the preparation of phosphorus-containing Mannich bases having the greatest possible proportion of tertiary phosphine oxide, it is preferred to use white phosphorus and alkylolamine in a proportion lying between 1:2.25 and 1:3, by weight. These proportions are apparent in Table I. The experiments compiled have been carried out using methylolpiperidine, or formaldehyde and piperidine, at 70° C. For each run 15 g. of white phosphorus were used. Moreover, a mixture of solvents is used in these cases, consisting of water and ethyl alcohol in a proportion lying between 1:1 and 0:1, by volume. Methyl alcohol, isopropyl alcohol and butyl alcohol in these cases are less suitable than ethyl alcohol. All these facts are evident from Table II. These experiments have been carried out at 70° C. using a ratio of reactants corresponding to $P:CH_2O:HNC_5H_{10}=1:2.5:2.5$. All the runs have been worked up as described in Example 9.

Moreover, it has been found that a mixture of solvents consisting of water and a strongly polar solvent miscible with water is favourable in the preparation of phosphorus-containing Mannich bases containing the greatest possible proportion of the corresponding phosphonic acids and phosphinic acids. Using a mixture of solvents consisting of, e.g. water and dimethyl sulfoxide in a ratio of 3:5, by volume, there have been obtained in, e.g. run 19 about 36% of piperidinomethylphosphonic acid and about 25% of bis(piperidinomethyl)phosphinic acid. The dependence of the yields of e.g. tris(piperidinomethyl)phosphine oxide upon the pH of the reaction mixture is apparent from Table III. These runs have been carried out using a ratio of $P:CH_2O:HNC_5H_{10}=1:2.5:2.5$ in a solvent mixture consisting of one volume part of water and one volume part of alcohol. In an uncontrolled reaction the pH decreases very fast from 11 to 8 and after having reached the neutral point it remains rather constant. The strong decrease of the pH is due to the formation of phosphinic acid and phosphonic acid. Since these acids are capable of forming betaines the reaction mixture does not become acidic. In order to get high yields of phosphine oxides it is preferred to keep the reaction mixture at about pH 7 or slightly above. Sometimes it is advantageous to use the amines in salt form, e.g. chlorohydrates. Suitable solvents miscible with water are e.g. methyl alcohol, ethyl alcohol, n-propyl alcohol, dimethylacetamide, pyridine, dioxane, 1,3-dioxolane, 1,2- and 1,3-glycerolformale, diethylsulfite, dimethylsulfone, dimethylsulfoxide, sulfolane, tetramethylurea. On using secondary amines or alkylolamines, acetone, methyl-ethylketone and the like are also suitable solvents. The reaction medium can also consist of two phases, one of them being water and the other an organic solvent which is not miscible with water such as hexane, benzene and the like.

In order to achieve the separation of the endproducts, the following information is useful which is that the endproducts which are free of hydroxyls, i.e. the corresponding phosphines and phosphine oxides, in contrast to the hydroxyl-containing products, are soluble in hydrophobic solvents, such as benzene, and the corresponding tertiary phosphine oxides having a longer chain aliphatic group or aryl group on the nitrogen atom, or those having heterocyclic amine groups, such as the piperidino group, in contrast to the corresponding phosphonic acids and phosphinic acids, are difficultly soluble in water. Moreover, the phosphonic acids and phosphinic acids can be converted into their alkali salts from which the phosphines and phosphine oxides can be separated by extraction with e.g. a hydrocarbon solvent. The hydroxyl-containing endproducts, i.e. the corresponding phosphonic acids and phosphinic acids can also be converted into the halides, amides or esters in known manner.

The phosphorus-containing Mannich bases are valuable intermediate products because of the great mobility of the aminomethyl group. The hitherto unknown compounds with long-chain aliphatic groups on the nitrogen, such as e.g. dodecyl, stearyl and the like can be added to synthetic fibers such as nylon and furnish them antistatic and flameproofing properties.

TABLE I

| Proportion $P:CH_2O:HNC_5H_{10}$ | Solvent | Reaction Time, Hours | Phosphine Oxide, Percent [1] |
|---|---|---|---|
| 1:2.25:2.25 | 60 ml. $H_2O$ +150 ml. $C_2H_5OH$ | 9 | 29.9 |
| 1:2.5:2.25 | 60 ml. $H_2O$ +150 ml. $C_2H_5OH$ | 9 | 37.5 |
| 1:3:3 | 60 ml. $H_2O$ +150 ml. $C_2H_5OH$ | 6.5 | 31.5 |
| 1:3.5:3.5 | 60 ml. $H_2O$ +150 ml. $C_2H_5OH$ | 9 | 26.6 |
| 1:2.25:2.25 | 60 ml. $H_2O$ +150 ml. $CH_3CN$ | 3 | 16.8 |
| 1:2.5:2.5 | 60 ml. $H_2O$ +150 ml. $CH_3CN$ | 2.75 | 32.6 |

[1] Yields based on the white phosphorus.

TABLE II

| Solvent | Reaction Time, Hours | Phosphine Oxide, Percent [1] |
|---|---|---|
| 60 ml. H₂O | [2] 1.5 | 13.3 |
| 60 ml. H₂O+150 ml. CH₃CN | 2.75 | 32.6 |
| 60 ml. H₂O+75 ml. C₂H₅OH | 12 | 35.7 |
| 60 ml. H₂O+150 ml. C₂H₅OH | 9 | 37.5 |
| 60 ml. H₂O+300 ml. C₂H₅OH | 10 | 34.5 |
| 60 ml. H₂O+200 ml. C₂H₅OH [3] | 14 | 32.2 |
| 60 ml. H₂O+150 ml. CH₃OH | 9 | 19.4 |
| 60 ml. H₂O+200 ml. i-C₃H₇OH | 10 | 17.4 |
| 60 ml. H₂O+200 ml. n-C₄H₉OH | 10 | 21.4 |
| 60 ml. H₂O+150 ml. THF | 12 | 23.0 |
| 60 ml. H₂O+200 ml. THF [3] | 20 | ([5]) |
| 60 ml. H₂O+70 ml. Et₃N+150 ml. EtOH | 10 | 9.7 |
| 60 ml. H₂O+150 ml. C₆H₆ | 13 | ([5]) |
| 60 ml. H₂O+150 ml. (CH₃)₂SO | 18 | 2.5 |
| 60 ml. H₂O+150 ml. acetone | 12 | 10 |
| 60 ml. H₂O+150 ml. CH₃COOH | [4] 11 | 2.4 |
| 60 ml. H₂O+100 ml. CH₃COOH | [4] 25 | ([5]) |
| 60 ml. H₂O+20 ml. 10 N KOH solution | 3 | 11.7 |

[1] Yields based on the white phosphorus.
[2] Reaction temperature 90° C.
[3] Paraformaldehyde has been used in this run.
[4] 100° C. (instead of 70° C.).
[5] These reactions were incomplete and the white phosphorus had only been partially used.

TABLE III

| pH | Temperature, °C. | Reaction Time, Time, Hours | Phosphine Oxide, percent |
|---|---|---|---|
| 11–7 [1] | 82 | 8 | 42.5 |
| 10 [2] | 82 | 1.5 | 4.1 |
| 7 [2] | 85 | 6 | 41.2 |
| 6 [3] | 85 | 11 | 11.2 |
| 4 [3] | 85 | 57 | ([4]) |

[1] Uncontrolled reaction.
[2] Adjusted with NaOH.
[3] Adjusted with acetic acid.
[4] Reaction not complete.

Example 1

To 56.2 g. (1.25 moles) of dimethylamine in 150 ml. of ethyl alcohol are added by drops under cooling with ice 99.8 ml. of a 40% formaldehyde solution and then under nitrogen 15 g. (0.483 mole) of white phosphorus. After refluxing for 15 hours one obtains a clear, yellow-coloured solution. After evaporation of the alcohol the product becomes viscous, semisolid (165.3 g.). Extraction with ether yields 47.8 g. (44.6%) of tris(dimethylaminomethyl)phosphine oxide; M.P. 154–157° C. The oxide can be sublimed at normal pressure and then yields transparent needles. The solubility is 93 g. in 100 ml. of water at 20° C.

Analysis.—C₉H₂₄N₃OP (221.28): Calc'd percent: C, 48.84; H, 10.93; N, 18.98. Found percent: C, 48.18; H, 10.40; N, 18.38.

As residue of the extraction remain 57.2 g. of a viscid product, which yields upon heating at 170° C. 12 g. of water and further 0.5 g. of tris(dimethylaminomethyl)phosphine oxide and becomes brittle, yellow and transparent. An aqueous solution shows in the ³¹P–NMR spectrum the following signals: −37.2 (∼2.9%); −22.7 (J$_{PCH}$∼14 cps., quintet, ∼21.9%); −13.0 (∼2.9%); −8.8 (J$_{PCH}$∼14 cps., triplet, ∼24.8%); and −1.5 (∼2.9%). The signals at −22.7 and −8.8 p.p.m. have to be attributed to the phosphinic acid and phosphonic acid, resp.

At a proportion of P$_W$:CH₂O:HN(CH₃)₂=1:3:3 only 36.9% of tris(dimethylaminomethyl)phosphine oxide has been obtained.

Example 2

A mixture of 3.9 g. (0.125 mole) of white phosphorus, 25 ml. of 40% formaldehyde solution, 100 ml. of ethyl alcohol and 129.1 g. (0.312 mole) of di-n-dodecylamine yields after stirring at 80° C. for ½ hour a completely clear solution. This solution is concentrated in vacuum, made strongly alkaline with potash lye and then extracted with benzene. After evaporation of the benzene the residue is acidified with hydrochloric acid to destroy the Mannich base and then completely concentrated by evaporation. Then the residue is made alkaline and extracted with benzene. After evaporation of the benzene one obtains a yellow oil, which solidifies at room temperature. One obtains 54 g. (38.4%) of raw tris(di-n-dodecylaminomethyl)phosphine oxide; M.P. 77–79° C. (from hexane).

Analysis.—C₇₅H₁₅₆N₃OP (1128.99): Calc'd percent: C, 79.78; H, 13.92; N, 3.72; P, 2.74. Found percent: C, 79.32; H, 13.90; N, 3.62; P, 2.54.

Example 3

In same manner as in Example 2 one obtains tris(di-n-octadecylaminomethyl) phosphine oxide in 40% yield; M.P. 35–37° C.

Analysis.—C₁₁₁H₂₂₈N₃OP (1651.9): Calc'd percent: C, 80.7; H, 13.91; N, 2.54; P, 1.87. Found percent: C, 78.86; H, 13.42; N, 2.56; P, 1.66.

Example 4

A mixture of 15.5 g. (0.5 mole) of white phosphorus, 37.5 g. (1.25 moles) of a 37.4% formaldehyde solution and 150 ml. of alcohol are slowly mixed under nitrogen with 109 g. (1.25 moles) of morpholine and thus refluxed until all the phosphorus is dissolved. (Duration about 50 hours). Then the reaction mixture is evaporated under vacuum. There remains a waxy mass, which is extracted several times with acetone at boiling temperature. The residue which is insoluble in acetone becomes a foamy (30 g.) solid when the solvent is evaporated. The acetone extract is evaporated and extracted with ether, until no more oxide is dissolved. Insoluble residue 58 g. From the ether extracts one obtains by low temperature cooling 35.3 g. (20.3%) of tris(morpholinomethyl)phosphine oxide; M.P. 157–161° C. (red melt). For the analysis a part of it is recrystallized once again from ether and obtained in the form of white needles having the M.P. 160–161.3% (red melt). ³¹P-chem. shift (in water) −50.6 p.p.m.

The oxide is very soluble in nearly all organic solvents and in water. The solubility is 213.0 g. in 100 ml. of water at 19.8° C.

Analysis.—C₁₅H₃₀N₃O₄P (347.39): Calc'd percent: C, 51.85; H, 8.70; N, 12.09; P, 8.91. Found percent: C, 51.31; H, 8.92; N, 12.19; P, 8.59.

The portion which is insoluble in acetone and ether shows in the ³¹P–NMR-spectrum the following signals: −50.6 (about 19%, phosphine oxide), −30.7 (about 6.0%), −26.8 (about 19.7%), −14.7 (about 7.6%) and −5.9 (about 28.0%). The two main peaks at −26.8 and 5.9 p.p.m. are attributed to the phosphinic acid

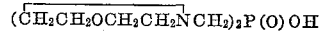

and the phosphonic acid

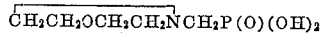

respectively.

Example 5

To N-hydroxymethyldiethylamine prepared from 110 g. (1.5 moles) of et₂NH and 130 ml. of 35% CH₂O (45 g., 1.5 moles) are added under nitrogen 14 g. (0.45 mole) of white phosphorus and then the mixture is refluxed, until all the phosphorus is dissolved (duration 2½–2¾ hours). Two clear, nearly equally large, yellowish to reddish coloured layers are present. The two layers are separated and the P³¹–NMR spectrum is made of each one. The upper layer shows the following signals: −48.7 (about 17.1%), −43.9 (about 4.2%), −32.9 (about 8.5%), −23.4 (about 8.6%), +67.9 (about 13.3%) p.p.m. The lower layer shows two signals at −30.3 (about 17.9%) and −6.1 (about 30.4%) p.p.m. By comparison with known samples the following signals can be attributed to various compounds: −43.9 p.p.m. (et₂NCH₂)₃P=O; +67.9 p.p.m. (et₂NCH₂)₃P; −30.3 p.p.m.

(et$_2$NCH$_2$)$_2$P(O)OH and −6.1 p.p.m. et$_2$NCH$_2$P(O)(OH)$_2$; moreover −48.7 p.p.m. (HOCH$_2$)$_2$P(O)OH and −23.4

HOCH$_2$P(O)(OH)$_2$

To work up the reaction mixture 70 ml. of benzene are added to the original reaction mixture, then shaken thoroughly, the two layers are separated and the lower, aqueous layer is again shaken thoroughly with 100 ml. of benzene. The extracts of benzene are combined and washed twice with a 10% NaOH solution. Then one dries with siccone and the benzene is distilled off. The liquid yellow residue (42 g.) is fractionated. One obtains after 1 g. of forerun (B.P. 38–65°/0.3 mm.) 8 g. of a colourless liquid (B.P. 70–125° C./0.2 mm.), which yields after a further distillation besides a small forerun, which contains the secondary phosphine bis(diethyl-aminomethyl)phosphine, (et$_2$NCH$_2$)$_2$PH according to the $^{31}$P–NMR spectrum (signal at +97.9 and 105.9 p.p.m., intensity 1–1, J$_{P-H}$ 194 cps.) 6.7 g. (=5.1% based on the utilized phosphorus) of tris(diethylaminomethyl) phosphine, (et$_2$NCH$_2$)$_3$P; B.P. 110–115°/1.2 mm., $n_D^{20}$=1.4762. (Lit. L. Maier, Progress in Inorganic Chemistry, vol. 5, page 185.) B.P. 121°/2 mm., $n_D^{25}$=1.4725. $^{31}$P-chem. shift (in substance) +65.3 p.p.m. (Lit. loc. cit.+65.7 p.p.m.).

Analysis.—C$_{15}$H$_{36}$N$_3$P (289.4): Calc'd percent: N, 14.52. Found percent: N, 14.30.

The residue of the distillation (33 g.), which becomes solid on cooling (M.P. about 65°) is extracted with ether. On evaporation of the ether one obtains 25 g. (=18.2% based on the utilized phosphorus) of tris (diethylaminomethyl)phosphine oxide, (et$_2$NCH$_2$)$_3$P=O; M.P. 69–72°. For the analysis a sample was sublimed in the high vacuum at 70° and then recrystallized twice from benzene. M.P. of the pure oxide 73.4–74.2° (corrected). $^{31}$P-chem. shift (in benzene) −43.2 p.p.m.

Analysis.—C$_{15}$H$_{36}$N$_3$OP (305.44): Calc'd percent: C, 58.98; H, 11.88; N, 13.76. Found percent: C, 58.74; H, 11.71; N, 13.88.

The oxide is hydroscopic, easily soluble in water and in all organic solvents.

The lower, aqueous layer, which shows in the $^{31}$P–NMR spectrum signals for the phosphinic acid (et$_2$NCH$_2$)$_2$P(O)OH at −30.3 p.p.m. and for the phosphonic acid et$_2$NCH$_2$P(O)(OH)$_2$ at −6.1 p.p.m. in the proportion of about 1:2, yields after the evaporation in high vacuum yields a sirupy, viscous liquid, which does not crystallize.

Analysis.—(C$_2$H$_5$)$_2$NCH$_2$P(O)(OH)$_2$ (167.1): Calc'd percent: C, 35.92; H, 8.44; N, 8.38; P, 18.53.

[(C$_2$H$_5$)$_2$NCH$_2$]$_2$P(O)OH (236.30): Calc'd percent: C, 50.83; H, 10.66; N, 11.86; P, 13.11. Found percent: C, 39.88; H, 8.99; N, 8.65; P, 15.51 (for the mixture).

The phosphonic acid et$_2$NCH$_2$P(O)(OH)$_2$ has by way of comparison also been obtained from H$_3$PO$_3$, CH$_2$O and diethylamine as viscous liquid and showed in aqueous solution a $^{31}$P-chem. shift of −7.3 p.p.m. Disodium salt in water −7.3 p.p.m.

Example 6

A mixture of 7.5 g. of P$_W$ (0.25 mole), 49.9 ml. of CH$_2$O (40%), 75 ml. of ethyl alcohol and 113.2 g. (0.625 mole) of dicyclohexylamine becomes totally clear at 80° after ¾ hour. After the evaporation of the alcohol using a rotary evaporator the residue is extracted with light petroleum. It remains an oily liquid. The extract of the light petroleum is washed with H$_2$O. After longer standing a white substance separates, which yields after recrystallizing from alcohol 4.9 g. (3.2%) of tris(dicyclohexylaminomethyl)phosphine oxide; M.P. 214–215°.

Analysis.—C$_{39}$H$_{72}$N$_3$OP (629.96); Calc'd percent N, 6.67. Found percent: N, 6.45. From the filtrate one obtains 32 g. of the Mannich base (C$_6$H$_{11}$)$_2$NCH$_2$N(C$_6$H$_{11}$)$_2$; B.P. 65–68°/0.01 mm.

Analysis.—C$_{25}$H$_{46}$N$_2$ (374.63): Calc'd percent: H, 12.37; N, 7.47. Found percent: H, 12.38; N, 7.30.

Example 7

A mixture of 15.5 g. (0.5 mole) of P$_W$, 94 ml. of CH$_2$O (40%), 89 g. (1.25 moles) of pyrrolidine and 150 ml. of alcohol yields after stirring at 80° for 45 minutes a clear yellow solution, which leaves after evaporation using a rotary evaporator 138 g. of residue. Extraction with benzene and evaporation yield 74.9 g. of a solid, yellowish to reddish coloured product and 58 g. of a very viscous, reddish oil which is insoluble in benzene. The benzene soluble residue (74.9 g.) is now extracted several times with hexane. The residue is a reddish, viscous mass (20.3 g.). From the extracts of hexane one obtains on concentration 52.5 g. (35%) of crude tris(pyrrolidinomethyl) phosphine oxide; M.P. 145–147°, after repeated recrystallization from hexane, M.P. 150.5–153°. $^{31}$P chemical shift (in water) −45.8 p.p.m.; (in alcohol) −48.4 p.p.m. The solubility is 26.84 g. in 100 ml. of water at 18.5° C.

Analysis.—C$_{15}$H$_{30}$N$_3$OP (300.39): Calc'd percent: C, 60.2; H, 10.1; N, 14.01; P, 10.35. Found percent: C, 59.44; H, 10.01; N, 13.35; P, 10.47.

Example 8

A mixture of 7.7 g. (0.25 mole) of P$_W$, 49.9 ml. of CH$_2$O (40%), 80.76 g. of (C$_4$H$_9$)$_2$NH (0.625 moles) and 125 ml. of C$_2$H$_5$OH yields after stirring at 80° for 3 hours a clear solution. Two phases are present. On cooling further 1.5 g. of P$_W$ separate. The latter is filtered off and the filtrate evaporated. Yield 94.4 g. of an oily liquid. This liquid is made strongly alkaline with KOH and extracted with benzene. After the concentration of the benzene extract by evaporation the residue is acidified with HCl in order to destroy the Mannich base and then completely concentrated. One makes alkaline and extracts with benzene. After evaporation of the benzene one obtains a yellow oil which is heated in high vacuum at 80° to eliminate easily volatile constituents. According to the analysis the residue is tris(di-n-butylaminomethyl)phosphine oxide; M.P. −1 to 0.5°. Yield 26 g. (22%). $^{31}$P chemical shift −43.5 p.p.m. (impurity at −46.3 and −32.0 p.p.m.).

Analysis.—C$_{27}$H$_{60}$N$_3$OP (473.75): Calc'd percent: N, 8.87; P, 6.54. Found percent: N, 8.64; P, 6.03.

Example 9

To N-hydroxymethylpiperidine, prepared of 105.9 g. (1.24 moles) of piperidine and 37.2 g. (1.24 moles) of 37.4% CH$_2$O are added by cooling with ice under nitrogen 150 ml. of alcohol and 15 g. (0.484 mole) of white phosphorus and then the mixture is heated by stirring at 70° until a clear yellow solution is present. (About 8.5 hours.) Then the alcohol is evaporated under vacuum and the residue extracted several times with benzene. After evaporation of the benzene one obtains 82.8 g. of a solid yellow residue, which, after chromatography on basic aluminum oxide and recrystallization from low boiling petroleum ether (B.P. 30–40°) yields 62 g. (=37.5%) of tris(piperidinomethyl)phosphine oxide; 113–114° (slightly reddish melt).

For the analysis the product is recrystallized once again from petroleum ether and is obtained in the form of white needles, which melt at 119–120° (yellow melt). On standing at room temperature the oxide becomes yellowish. It is very soluble in hexane and petroleum ether and very well soluble in all other organic solvents. The solubility at 22° in 100 ml. of H$_2$O is 795 mg. $^{31}$P chemical shift (in alcohol) −51.0±0.5 p.p.m.

*Analysis.*—$C_{18}H_{36}N_3OP$ (341.47): Calc'd percent: C, 63.3; H, 10.62; N, 12.30; P, 9.07. Found percent: C, 63.51; H, 10.74; N, 12.36; P, 9.05.

From the non-crystallized portion of the benzene extract is obtained methylene-di-piperidine, $$C_5H_{10}NCH_2-NC_5H_{10}$$

B.P. 62–65°/0.2 mm., $n_D^{20}=1.4880$, by distillation. From the portion which is insoluble in benzene are obtained on concentration by evaporation under high vacuum 60 g. of a very viscous, honey-like, yellowish to reddish mass.

It shows in the $^{31}$P–NMR spectrum the following signals (dissolved in $H_2O$: −48.4 (about 2.1%), −26.3 (about 5.8%), −22.1 (about 2.3%), −18.7 (about 20.8%), −9.6 (about 3.4%), −5.8 (about 25.4%) and −1.6 p.p.m. (about 2.3%). Therefore the mass consists mainly of phosphinic acid $(C_5H_{10}NCH_2)_2P(O)OH$ (−18.7 p.p.m. about 20.8%) and of phosphonic acid $C_5H_{10}NCH_2P(O)(OH)_2$ (−5.8 p.p.m. about 25.4%). Besides there are present small amounts of bis(hydroxymethyl)phosphinic acid (−48.4 p.p.m.), hydroxymethylphosphonic acid (−26.3 p.p.m.) and piperidinomethylphosphonic acid (−22.1 and −1.6 p.p.m.).

*Example 10*

A mixture of 27 g. (0.9 mole) of formaldehyde in 100 ml. of water, 28 g. (0.9 mole) of methyamine and 12.4 g. (0.4 mole) of white phosphorus yields after refluxing for 2 to 2½ hours a clear solution. The solution is extracted with benzene. The benzene is evaporated and the residue is fractionally distilled. One obtains:

(1)            $(CH_3NHCH_2)_3P$
(2)            $(CH_3NHCH_2)_3PO$; M.P. 159°

The aqueous solution is concentrated by evaporation. The residue is a mixture of different compounds as an oil. Among these compounds are found:

(3)            $(CH_3NHCH_2)_2P(O)OH$
(4)            $CH_3NHCH_2P(O)(OH)_2$

*Example 11*

A mixture of 109 ml. of formaldehyde (40% solution), 65.5 g. of ethylamine and 15 g. of white phosphorus yields after refluxing for 2 to 2½ hours a clear solution. The solution is extracted with benzene. The benzene is evaporated and the residue fractionally distilled. One obtains:

(1)            $(C_2H_5NHCH_2)_3P$
B.P. 55–60°/0.02 mm., $n_D^{20}$ 1.4660

(2)            $(C_2H_5NHCH_2)_3PO$
B.P. 125–130°/0.02 mm., $n_D^{20}$ 1.5182

The aqueous solution is concentrated by evaporation. The residue is a mixture of different compounds as an oil. Among these compounds are found:

(3)      $C_2H_5NHCH_2P(O)OH$; viscous oil
(4)      $(C_2H_5NHCH_2)_2P(O)OH$: M.P. 165–166°

The ethylaminomethylphosphonic acid forms after addition of lead nitrate an insoluble lead salt, which is filtered off. The bis(ethylaminomethyl)phosphinic acid remains in the solution. The decomposition of the lead salt is achieved with hydrogen sulfide.

*Example 12*

In a mixture of 109 ml. of formaldehyde (40% solution), 85.5 g. of propylamine and 30 g. of white phosphorus, the phosphorus is dissolved after refluxing for 2 hours. Two layers are apparent. The upper layer is dissolved in benzene and separated. The benzene is evaporated and the residue fractionally distilled. One obtains:

(1)            $(C_3H_7NHCH_2)_3P$
B.P. 70–76°/0.05 mm., $n_D^{20}$ 1.4870

(2)            $(C_3H_7NHCH_2)_3PO$
B.P. 98–100°/0.05 mm., $n_D^{20}$ 1.5714

The aqueous solution is concentrated by evaporation. The residue is a mixture of different compounds as oil. Among these compounds are found:

(3)            $(C_3H_7NHCH_2)_2P(O)OH$
(4)            $C_3H_7NHCH_2P(O)(OH)_2$

*Example 13*

In a mixture of 66 g. of acetaldehyde in 100 ml. of water, 109.5 g. of diethylamine and 15.5 g. of white phosphorus, the phosphorus is dissolved after refluxing for 1 to 1¾ hours. A black precipitate is filtered off. The solution is extracted with benzene. The benzene is evaporated and the residue fractionally distilled. One obtains:

(1)            $[(C_2H_5)_2NCH(CH_3)]_3P$
(2)            $[(C_2H_5)_2NCH(CH_3)]_3PO$

The aqueous solution is concentrated by evaporation. The residue is a mixture of different compounds as oil. Among these compounds are found:

(3)            $[(C_2H_5)_2NCH(CH_3)]_2P(O)OH$
(4)            $(C_2H_5)_2NCH(CH_3)P(O)(OH)_2$

*Example 14*

A mixture of 7.5 g. (0.24 mole) of $P_w$, 47 ml. of $CH_2O$ (40%), 75 ml. of ethyl alcohol and 66.8 g. of methylaniline (0.625 mole) is heated. After refluxing for 9½ hours the phosphorus is consumed and much solid is deposited on the bottom. This is filtered off (86 g.) and the filtrate is concentrated by evaporation. There remains a small quantity of a highly viscous, brown mass (3.7 g.). The solid is dissolved in hot benzene. Upon cooling the product precipitates again; M.P. 162–183°. For the purification the solid is dissolved in $CHCl_3$ and precipitated with acetone.

One obtains 43.4 g. (44%) of tris(methlanilinomethyl)-phosphine oxide; M.P. 158–165°. The melt is very viscous, yellow, and becomes red on stronger heating.

Also one obtains 11.6 g. of substance insoluble in $CHCl_3$, which sinters at 70° becoming dark red.

*Example 15*

In particular simple manner one can obtain tris(piperidinomethyl)phosphine oxide by proceeding as follows:

A mixture consisting of 37.5 g. (1.25 moles) of paraformaldehyde, 106.5 g. (1.24 moles) of piperidine and 15.5 g. (0.5 mole) of white phosphorus in 200 ml. of alcohol is refluxed until the whole phosphorus is dissolved (duration about 14 hours). One obtains a clear yellow solution. This solution is concentrated by evaporation in the vacuum. The residue is a yellowish-white solid (153 g.), which now is stirred with one liter of water at room temperature for 2 hours. The tris(piperidinomethyl)phosphine oxide which is difficultly soluble in water and floating on the surface is filtered off and dried in the vacuum. Yield 48 g. Upon concentration of the filtrate there are obtained another 7 g. Total yield 55 g. (32.3%).

The complete concentration of the filtrate yields an orange honey-like mass (98 g.) which in aqueous solution shows the following peaks in the $^{31}$P–NMR spectrum: −48.8 (∼5.1% $(HOCH_2)_2P(O)OH$); −50.9 (∼8.8% phosphine oxide); −24.7 (∼0.6% $HOCH_2P(O)(OH)_2$); −20.7 (∼23.8% $(C_5H_{10}NCH_2)_2P(O)OH$, $J_{PCH}=12$ cps.); −11.4 (∼11.8% unknown, $J_{PCH}\sim12$ cps.); −5.8 (∼15.0% $C_5H_{10}NCH_2P(O)(OH)_2$, $J_{PCH}=15$ cps.); and −3.1 (∼3.1% unknown) p.p.m.

*Example 16*

To 65.7 g. (0.625 mole) of diethanolamine are added by cooling with ice 50 ml. of a 37% $CH_2O$ solution and then 7.75 g. (0.25 mole) of white phosphorus and 75 ml. of alcohol. After refluxing for 13 hours one obtains a clear, red solution. After concentration by evaporation the viscous residue is extracted in an extractor with acetonitrile (30 hours). Thereby 35 g. of tris(di-β-hydroxyethylaminomethyl)phosphine oxide are separated in the flask as viscous liquid. Upon concentration of the acetonitrile solution one obtains another 10 g. of the oxide. $^{31}$P-chem. shift —48.8 p.p.m. (impurities at —34.9; —20.2; and —12.4 p.p.m)

*Analysis.*— $C_{15}H_{36}N_3O_7P$ (401.4): Calc'd percent: N, 10.46. Found percent: N, 10.29.

An aqueous solution of the residue of extraction shows the following signals in the $^{31}$P–NMR spectrum: —48.8 p.p.m. (oxide~11%); —25.6 p.p.m. (phosphinic acid $[(HOCH_2CH_2)_2NCH_2]_2P(O)OH$~17%); —11.7 p.p.m. (unknown~10%); —7.7 p.p.m. (phosphonic acid $(HOCH_2CH_2)_2NCH_2P(O)(OH)_2$~17%)

*Example 17*

To 35.2 g. (0.25 mole) of 2,2,6,6,-tetramethylpiperidine are added by cooling with ice 19.8 g. (0.25 mole) of a 38% formaldehyde solution and then 3.0 g. (0.097 mole) of white phosphorus and 100 ml. of alcohol. After refluxing for 2 hours the phosphorus is consumed. The clear, yellow reaction solution is concentrated by evaporation and made alkaline with 10% soda lye and extracted with benzene and ether. From these extracts one obtains 1.5 g. of tris(2,2,6,6-tetramethylpiperidinomethyl)phosphine oxide as oil, which shows a signal at —46.7 p.p.m. in the $^{31}$P–NMR spectrum. The aqueous solution contains 2,2,6,6-tetramethylpiperidinomethyl) phosphonic acid and 2,2,6,6-bis(tetramethylpiperidinomethyl) phosphinic acid.

*Example 18*

To 24.8 g. (0.25 mole) of 2-methylpiperidine are added by cooling with ice 19.8 g. (0.25 mole) of a 37% formaldehyde solution and then 3.1 g. (0.1 mole) of white phosphorus and 100 ml. of alcohol. After refluxing for 10 hours the phosphorus is consumed. After concentration by evaporation one makes alkaline and extracts with methylene dichloride. From the $CH_2Cl_2$-extract one obtains after evaporation of the $CH_2Cl_2$ 17.0 g. of a yellow oil, which crystallizes after some time; M.P. 123–125° C. (from hexane); after the chromatography on neutral $Al_2O_3$ M.P. 128–130° C.; yield 44.3%.

*Analysis.*—$C_{21}H_{42}N_3PO$ (383.54): Calc'd percent: C, 65.75; H, 11.03; N, 10.95. Found percent: C, 65.60; C, 65.58; H, 10.54; H, 10.60; N, 12.22.

The residue which is insoluble in $CH_2Cl_2$ yields in the $^{31}$P–NMR spectrum only two signals: for the phosphinic acid $(2-CH_3C_5H_9NCH_2)_2P(O)OH$ at —17.7 p.p.m. (25%) and for the phosphonic acid $2-CH_3C_5H_9NCH_2P(O)(OH)_2$ at —10.7 p.p.m. (30.7%).

*Example 19*

To 24.8 g. (0.25 mole) of 3-methylpiperidine are added by cooling with ice 19.8 g. (0.25 mole) of a 37% formaldehyde solution and then 3.1 g. (0.1 mole) of white phosphorus and 100 ml. of alcohol. After refluxing for 48 hours the phosphorus is consumed. After concentration by evaporation one extracts with benzene. Therefrom one obtains by evaporation of the benzene 19 g. of a slightly brown coloured oil. Yield 49.5%; purification by chromatography; M.P. 68–70° C.

*Analysis.*—$C_{21}H_{42}N_3PO$ (383.54): Calc'd percent: C, 65.75; H, 11.03; N, 10.95. Found percent: C, 66.50; H, 10.85; N, 10.23.

In the $^{31}$P–NMR spectrum only one signal is shown at —54.4 p.p.m.

*Example 20*

To 24.8 g. (0.25 mole) of 4-methylpiperidine are added by cooling with ice 19.8 g. of a 37% formaldehyde solution and then 3.1 g. (0.1 mole) of white phosphorus and 100 ml. of alcohol. After refluxing for 48 hours the phosphorus is consumed. Now, one concentrates by evaporation and then extracts with $CHCl_3$. Therefrom are obtained 20 g. of a slightly brown coloured oil. Yield 52%; purification by chromatography M.P. 125–126° C.

*Analysis.*—$C_{21}H_{42}N_3PO$ (383.54): Calc'd percent: C, 65.75; H, 11.03; N, 10.95. Found percent: C, 63.67; H, 10.73; N, 10.48.

In the $^{31}$P–NMR spectrum a signal is shown at —50.9 p.p.m. The portion which is insoluble in benzene shows in an aqueous solution in the $^{31}$P–NMR spectrum three signals at —20.1 p.p.m. (14.4%)

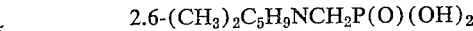

—10.1 p.p.m. (16.8%) and at —6.1 p.p.m. (16.8%) $4-CH_3-C_5H_9-NCH_2P(O)(OH)_2$.

*Example 21*

To 28.2 g. (0.25 mole) of 2,6-dimethylpiperidine are added by cooling with ice 19.8 g. of a 37% formaldehyde solution and then 3.1 g. (0.1 mole) of white phosphorus and 100 ml. of alcohol. After refluxing for 42 hours the phosphorus is consumed. After concentration by evaporation and extraction with $CHCl_3$ one obtains 4.2 g. of an oil. Yield 10%; purification by chromatography M.P. 170° C. In the $^{31}$P–NMR spectrum is shown a signal at —45.2 p.p.m. (trace of impurity at —54.4 p.p.m.). The portion which is insoluble in $CHCl_3$ shows in aqueous solution the following signals in the $^{31}$P–NMR spectrum: —50.0 p.p.m. (~18%), —26.8 p.p.m. (~20%), —19.8 p.p.m. (~16%), $2.6(CH_3)_2C_5H_8NCH_2)_2P(O)(OH)_2$, —10.5 p.p.m. (~20%), —6.5 p.p.m. (~16%)

The embodiments of the invention in which an exclusive property or privilege is claimed are defined as follows:

1. A process for preparing phosphorus-containing Mannich bases of the formula $(HO)_aP(O)_b(RNR'R'')_c$ wherein R is a group CHR''' wherein R''' is a hydrogen atom or a hydrogen group, R' when taken singly is a hydrogen atom, a hydrocarbon group or a hydroxy-substituted hydrocarbon group, R'' when taken singly is a hydrocarbon group or a hydroxy-substituted hydrocarbon group, and R' and R'' when taken together with the nitrogen atom to which they are attached form heterocyclic groups having in the ring substituents selected from the group consisting of methylene groups, methyl-substituted methylene groups, nitrogen atoms and oxygen atoms, $a=0$, 1 or 2 but is 0 if $b=0$, $b=0$ or 1, $c=1$, 2 or 3 and $a+b+c=3$ or 4 depending on the valence of the phosphorus atom, comprising reacting white phosphorus with an aldehyde and a primary or secondary amine or with an alkylolamine in a solvent for the reaction, and the aldehyde and amine or alkylolamine are limited to give the Mannich bases described hereinabove.

2. A process of claim 1 wherein the solvent is water.
3. A process of claim 1 wherein the solvent is ethyl alcohol.
4. A process of claim 1 wherein the solvent is a mixture of ethyl alcohol and water.
5. A process of claim 1 wherein the aldehyde is formaldehyde.
6. A process of claim 1 wherein the aldehyde is acetaldehyde.
7. A process of claim 5 wherein the amine is a di-n-alkyl secondary amine.
8. A process of claim 6 wherein the amine is a di-n-alkyl secondary amine.
9. A process of claim 5 wherein the amine is an n-alkyl primary amine.
10. A process of claim 5 wherein the amine is a dicycloalkyl secondary amine.
11. A process of claim 5 wherein the amine is morpholine.

12. A process of claim 5 wherein the amine is pyrrolidine.

13. A process of claim 5 wherein the amine is piperidine.

14. A process of claim 5 wherein the amine is a methyl-substituted piperidine.

15. A process of claim 5 wherein the amine is methylaniline.

References Cited

Kreutzkamp et al.: Chemical Abstracts, vol. 55, 10,360 (1961).

ALEX MAZEL, *Primary Examiner.*

J. TOVAR, *Assistant Examiner.*